US009101041B2

(12) United States Patent
Reinke et al.

(10) Patent No.: US 9,101,041 B2
(45) **Date of Patent: *Aug. 4, 2015**

(54) PLASMA TORCH HEAD, PLASMA TORCH SHAFT AND PLASMA TORCH

(75) Inventors: Ralf-Peter Reinke, Finsterwalde (DE); Timo Grundke, Finsterwalde (DE); Frank Laurisch, Finsterwalde (DE); Volker Krink, Finsterwalde (DE)

(73) Assignee: Kjellberg Finsterwalde Plasma und Maschinen GmbH, Finsterwalde (DE)

( * ) Notice: Subject to any disclaimer, the term of this patent is extended or adjusted under 35 U.S.C. 154(b) by 1145 days.

This patent is subject to a terminal disclaimer.

(21) Appl. No.: 12/377,621

(22) PCT Filed: Aug. 13, 2007

(86) PCT No.: PCT/DE2007/001430

§ 371 (c)(1),
(2), (4) Date: Feb. 16, 2009

(87) PCT Pub. No.: WO2008/019661

PCT Pub. Date: Feb. 21, 2008

(65) Prior Publication Data

US 2010/0264120 A1 Oct. 21, 2010

(30) Foreign Application Priority Data

Aug. 16, 2006 (DE) ........................ 10 2006 038 134

(51) Int. Cl.
*H05H 1/34* (2006.01)
*B23K 10/00* (2006.01)

(52) U.S. Cl.
CPC ......... *H05H 1/34* (2013.01); *H05H 2001/3478* (2013.01)

(58) Field of Classification Search
CPC .................................. H05H 1/34; B23K 10/00
USPC ................ 219/121.36, 121.48, 121.5, 121.58
See application file for complete search history.

(56) References Cited

U.S. PATENT DOCUMENTS

| | | | | |
|---|---|---|---|---|
| 3,756,511 A | | 9/1973 | Shinroku et al. | 239/132.3 |
| 3,851,824 A | | 12/1974 | Svensson | 239/132.3 |
| 4,236,059 A | | 11/1980 | McComas et al. | 219/121 |
| 4,919,334 A | | 4/1990 | Hartmann et al. | |
| 4,954,688 A | * | 9/1990 | Winterfeldt | 219/121.5 |
| 5,396,043 A | | 3/1995 | Couch, Jr. et al. | 219/121.5 |
| 5,624,586 A | | 4/1997 | Sobr et al. | |
| 5,856,647 A | | 1/1999 | Luo | |
| 6,169,264 B1 | * | 1/2001 | Marhic | 219/121.5 |
| 6,534,747 B1 | | 3/2003 | Rehrig | |

FOREIGN PATENT DOCUMENTS

| | | | |
|---|---|---|---|
| DE | 82105656.1 | | 6/1982 |
| DE | G8132660.2 | | 4/1983 |
| DE | 8425168 | * | 8/1984 |

(Continued)

OTHER PUBLICATIONS

Machine translation of DE 8425168, Apr. 2011.*

*Primary Examiner* — Tu B Hoang
*Assistant Examiner* — Thomas Ward
(74) *Attorney, Agent, or Firm* — Jonathan M. D'Silva; MacDonald, Illig, Jones & Britton LLP

(57) ABSTRACT

A plasma torch head, a plasma torch shaft and a plasma torch for providing a quick and simple possibility of changing the plasma torch head are described.

35 Claims, 10 Drawing Sheets

(56) References Cited

FOREIGN PATENT DOCUMENTS

| | | | | |
|---|---|---|---|---|
| DE | G8425168.9 | | | 11/1984 |
| DE | WO 92/00658 | | | 1/1992 |
| DE | WO96/21338 | | | 7/1996 |
| DE | 69511728 | T2 | | 1/2000 |
| DE | WO 01/98013 | A1 | | 12/2001 |
| WO | WO 96/21339 | | * | 7/1996 |
| WO | WO2005/057994 | A1 | | 6/2005 |
| WO | WO2008/019661 | A2 | | 2/2008 |

* cited by examiner

PLASMA TORCH HEAD, PLASMA TORCH SHAFT AND PLASMA TORCH

BACKGROUND

The present invention relates to a plasma torch head, comprising at least one fluid passage, an electrode, a nozzle, a current conductor and a bearing surface on a bearing side, a plasma torch shaft, comprising at least one feed line for a gas, a current supply line, at least one fluid passage, a current conductor and a bearing surface on a bearing side and a plasma torch with at least one feed line for a gas, an electrode, a nozzle and a current supply line, the plasma torch comprising a plasma torch shaft containing at least one first fluid passage, a first current conductor and a first bearing surface on a bearing side, and a plasma torch head containing at least one second fluid passage, a second current conductor and a second bearing surface on a bearing side, the first and second bearing surfaces resting axially relative to one another, the at least one first fluid passage being in fluid connection with the at least one second fluid passage, and the first current conductor being in electric connection with the second current conductor.

Plasma torches are known which consist of a plasma torch shaft and a plasma torch head, which can be joined together by means of a quick change connector. In the plasma torch head there are the parts of the plasma torch which wear quickly in operation and have to be replaced frequently. These are above all the electrode, the nozzle and the cover guard. However, it may also be necessary to change from one plasma torch cutting head to another in the case of varying uses of the plasma process, such as between cutting structural steel and cutting stainless steel. In order to do this quickly, a quick change connector is helpful.

German Document No. G 81 32 660.2 describes a plasma torch consisting of a plasma torch shaft, an attachable connector and a plasma torch head. The plasma torch has a locking pin projecting from the coupling surface and a corresponding hole on the opposing coupling surface, in which the locking pin can be inserted when precisely radially adjusted. The plasma torch shaft and the connector are connected in bayonet fashion by means of a sleeve, which can be displaced on the plasma torch shaft, with guide pins that can be inserted into corresponding axial and radial guide grooves in the connector, by subjecting the sleeve to axial pressure and radial movement. Both in the case of manual operation and in the case of automated systems, it is inconvenient first to introduce the locking pin into the hole and then to connect the other contacts for the delivery and supply lines. In addition, damage cannot be ruled out.

German Document No. DE 695 11 728 T2 describes an alignment means and a method for an arc plasma torch system. The arc plasma torch consists of an arc plasma torch shaft and an arc plasma torch head. An overall positioning guide is used in order to align the arc plasma torch with a seat at the beginning. The seat may be a bevelled edge. The seat has two passages with a receiving end and an upper side which are dimensioned such that alignment pins with a specific diameter are received. The alignment pins also have apertures which can permit a gas or fluid to pass through. The surface diameter is greater than the passage diameter and can thus compensate for minor misalignments. A central passage is similarly dimensioned and can likewise conduct a gas or fluid through. In the case of incorrect positioning, damage can be caused to the alignment pins if a force acts in the axial direction of the arc plasma torch after the central passage has been inserted. If the alignment pins are used simultaneously as a passageway for a gas or fluid, this can lead to leaks. Damage to the alignment pins makes it difficult to position and connect the components of the arc plasma torch later, especially if a slight tolerance is required in the axes of the arc plasma torch head and the seat.

In addition, the insertion of two cylindrical bodies of a plasma torch is known in principle. There is, however, a risk of joining the wrong connections together and/or of damaging them. It is also often necessary for the connection to be highly centered. In such cases, the play between an inner and outer cylinder must be very small. Such an arrangement also makes it difficult to join the parts together.

It is therefore an object of the invention to provide a quickly changeable plasma torch head. According to the invention, a plasma torch head has, on its bearing side, a cylinder wall with an outer surface and an annular surface, $n_{Ver}$ similar radial indentations and $n_{Vor}$ similar radial projections being provided peripherally on the outer surface, where $n_{Ver}$, $n_{Vor}$ is $\geq 0$ and $n_{Ver}+n_{Vor}$ is $\geq 5$. The quantity n represents combined radial indentations and radial projections such that $n_{Ver}+n_{Vor}=n$. If n=5, the sum of two adjacent angles at the center by which the projections and indentations or one projection and one indentation are offset from one another is not ≥180° and the five angles at the center are different in size. If n>5, the sum of two adjacent angles at the center by which the projections and indentations or one projection and one indentation are offset from one another is not ≥180° and the n>5 angles at the center are different in size or at least two of the n>5 angles at the center are equal in size. In each case the sum of the respective angles at the center occurring twice and the adjacent angles at the center on either side thereof is <180°.

It will be appreciated that the current conductor can be implemented in integrated and/or separate form in the fluid passageways within the contemplated cope of the invention.

Normally, there are at least three fluid passageways, namely for supplying gas, such as plasma gas, and the feed and return lines for coolant.

The plasma torch shaft, on its bearing side, has a cylinder wall with an outer surface, $n_{Vor}$ similar radial projections and $n_{Ver}$ similar radial indentations being provided peripherally on the outer surface, where $n_{Vor}$, $n_{Ver}$ is $\geq 0$ and $n_{Vor}+n_{Ver}=n\geq 5$. If n=5, the sum of two adjacent angles at the center by which the projections and indentations or one projection and one indentation are offset from one another is not ≥180° and the five angles at the center are different in size. If n>5, the sum of two adjacent angles at the center by which the projections and indentations or one projection and one indentation are offset from one another is not ≥180° and the n>5 angles at the center are different in size or at least two of the n>5 angles at the center are equal in size. In each case the sum of the respective angles occurring twice at the center and the adjacent angles at the center on either side thereof is <180°.

It will be appreciated that the plasma torch heads and shafts may be plasma cutting or plasma welding heads and shafts, respectively, within the contemplated scope of the invention.

One of the plasma torch shaft and the plasma torch head has, on its bearing side, a first cylinder wall with an outer surface and an annular surface and an external diameter D21$a$, and the other of the plasma torch shaft and the plasma torch head has, on its bearing side, a second cylinder wall with an inner surface and internal diameter D31$a$, where D31$a$ is >D21$a$, and $n_{Vor}$ similar radial projections and $n_{Ver}$ similar radial indentations being provided peripherally on the inner surface, where $n_{Vor}$, $n_{Ver}$ is $\geq 0$ and $n_{Vor}+n_{Ver}=n\geq 5$, and a similar number of corresponding indentations or projections in engagement with them being provided on the outer surface. The projections and indentations are further arranged such that when the plasma torch shaft is connected to the plasma torch head, the projections and indentations first have to be brought into engagement before the first bearing surface and the second bearing surface come to abut each other. If n=5, the sum of two adjacent angles at the center by which the projections and indentations or one projection and one indentation are offset from one another is not ≥180° and the five angles at the center are different in size. If n>5, the sum of two adjacent angles at the center by which the projections and indentations or one projection and one indentation are offset from one another is not ≥180° and the n>5 angles at the center are different in size or at least two of the n>5 angles at the center are equal in size. In each case the sum of the respective angles occurring twice at the center and the adjacent angles at the center on either side thereof is <180°.

The specific number and arrangement of projections and corresponding indentations makes it possible to join the plasma torch head and plasma torch shaft together quickly and easily, without jamming. It is merely necessary for the annular surface to be simply brought to rest against the projections, i.e. to be placed in a joining position, and then to be turned relative to the projections until the joint position is reached, in which, when an axial force is applied, the projections and indentations engage with one another. This is particularly advantageous in situations in which the plasma torches are clamped in and are not visually accessible. The rapid exchange of the plasma torch head can be carried out blindly.

In addition, the invention offers a quick-change connection between the plasma torch head and the plasma torch shaft with protection against twisting, a small tolerance between the axes of the plasma torch head and the plasma torch shaft with a high degree of centralisation.

The fluid passageways both for the gas, and also as plasma and secondary gas, and for the coolant, can also be used for transporting current.

It will be appreciated that the plasma torch can be a plasma cutting or welding torch within the contemplated invention scope.

In the plasma torch head, it can be provided that the sum of two adjacent angles at the center is ≤170°. In this way, an even more stable abutment of the annular surface and projections in the joint position is achieved.

According to one particular embodiment of the invention n=5 and the sum of two adjacent angles at the center is not repeated. According to a further particular embodiment, the plasma torch head contains four fluid passageways. In some embodiments, the at least one fluid passage is advantageously provided with a connector.

The current conductor can also be conveniently provided with a connector in some anticipated embodiments. In addition, it can be provided that indentations are rectangular grooves. It will be further appreciated that the grooves can also be other shapes, such as arcuate, triangular etc.

According to one anticipated embodiment, $n_{Ver.}$ is ≥5. It will be further appreciated that $n_{Vor.}$ can be ≥5.

In some embodiments, on the inner surface of the cylinder wall, a peripheral chamfer extending radially outwards can, for example, be provided towards the bearing side before the projections. Such anticipated arrangements allow for easier joining together of parts because a larger diameter is available at the beginning of the joining action.

In some embodiments of the plasma torch, for example, the plasma torch head can have a first cylinder wall and the plasma torch shaft can have a second cylinder wall.

BRIEF DESCRIPTION OF THE DRAWINGS

Further features and advantages of the invention will become clear from the claims the following description, in which embodiments of the invention are illustrated in detail with reference to the schematic drawings.

FIG. 6*a* shows a detail from FIG. 6 in one embodiment according to the invention;

FIG. 6*b* shows a detail from FIG. 6 in one embodiment according to the invention;

FIG. 6*c* shows a detail from FIG. 6 in one embodiment according to the invention;

FIG. 6*d* shows a detail from FIG. 6 in one embodiment according to the invention;

FIG. 6*e* shows a detail from FIG. 6 in one embodiment according to the invention;

FIG. 6*f* shows a detail from FIG. 6 in one embodiment according to the invention;

DETAILED DESCRIPTION

Figure 1:
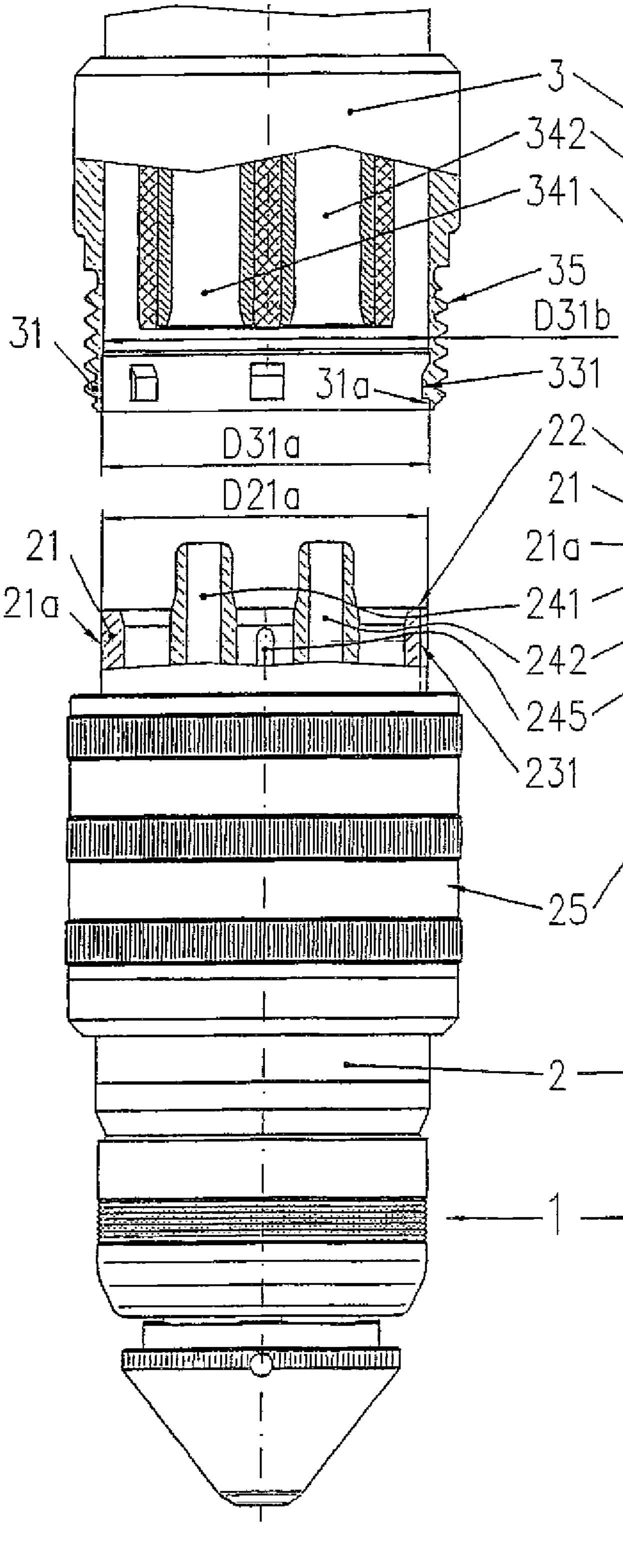
FIG. 1 shows a side view of a front part of a plasma cutting torch before the plasma cutting torch head and plasma cutting torch shaft are joined together, in accordance with a particular embodiment of the present invention, partially in section.
Figure 2:
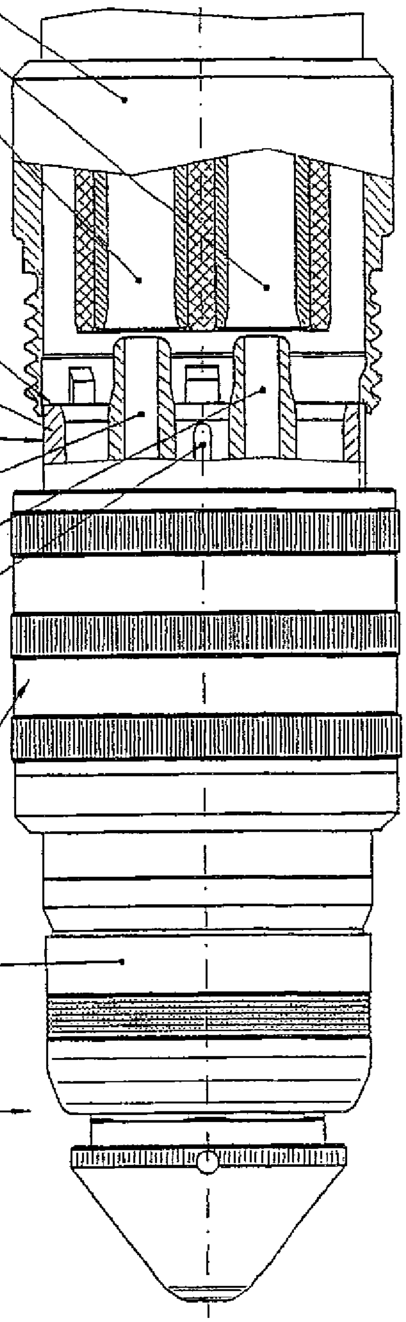
FIG. 2 shows a side view of the front part of the plasma cutting torch while the plasma cutting torch head and plasma cutting torch shaft are being joined together in the joint position, partially in section.

Referring to FIGS. 1 and 2, a plasma cutting torch 1 comprises a plasma cutting torch head 2 and a plasma cutting torch shaft 3. As can be seen with reference to FIGS. 3*a* and 3*b* and also FIG. 5, the plasma cutting torch head 2 has a first bearing surface (not shown), a connector 241 for water feed, a connector 242 for water return, a connector 243 for plasma gas, a connector 244 for secondary gas and a connector 245 for pilot current. The connectors 241 to 245 are provided with holes (not indicated) for the passage of gas or fluids. The plasma cutting torch shaft 3 has a second bearing surface (not shown), a socket 341 for water return, a socket 342 for water feed, a socket 343 for plasma gas, a socket 344 for secondary gas and a socket 345 for pilot current.

The connectors 241 to 245 and the sockets 341 to 345 form a quick-change interface. It will be appreciated that all or some of the connectors can alternatively be disposed on the plasma cutting torch shaft and the sockets on the plasma cutting torch head. It will be further appreciated that fluid passageways and current lines in the plasma cutting torch head 2 and in the plasma cutting torch shaft 3 can be used for supply purposes.

The plasma cutting torch head 2 has a first cylinder wall 21 on its bearing side with an outer surface 21*a* and an annular surface 22 and an external diameter D21*a*. The plasma cutting torch shaft 3 has a second cylinder wall 31 on its bearing side with an inner surface 31*a* and an internal diameter D31*a*, where D31*a* is >D21*a*. In order to insert the plasma cutting torch head 2 into the plasma cutting torch shaft 3, the latter has considerable play S in the joining position (see FIGS. 6*a*, 6*d*, 6*e* and 6*f*).

Figure 3A:
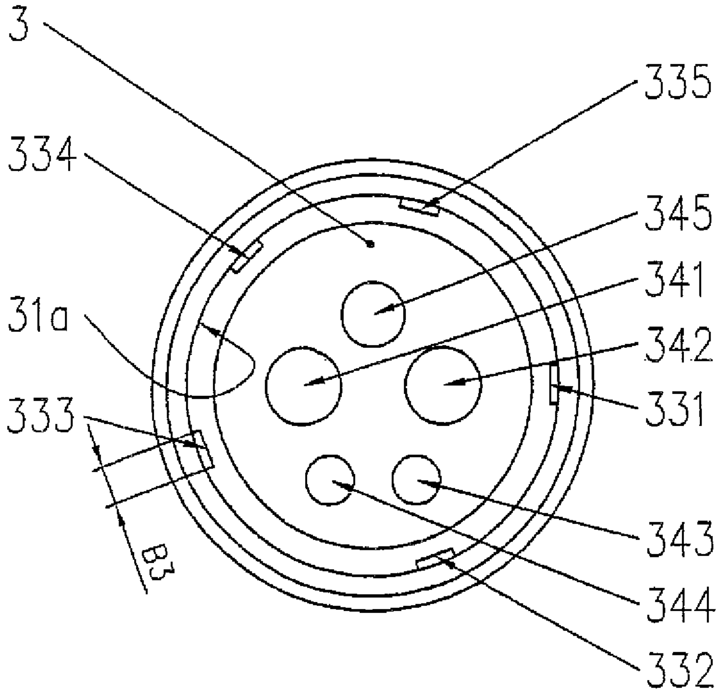
FIG. 3*a* shows a plan view of the plasma cutting torch shaft from the bearing side.
Figure 3B:
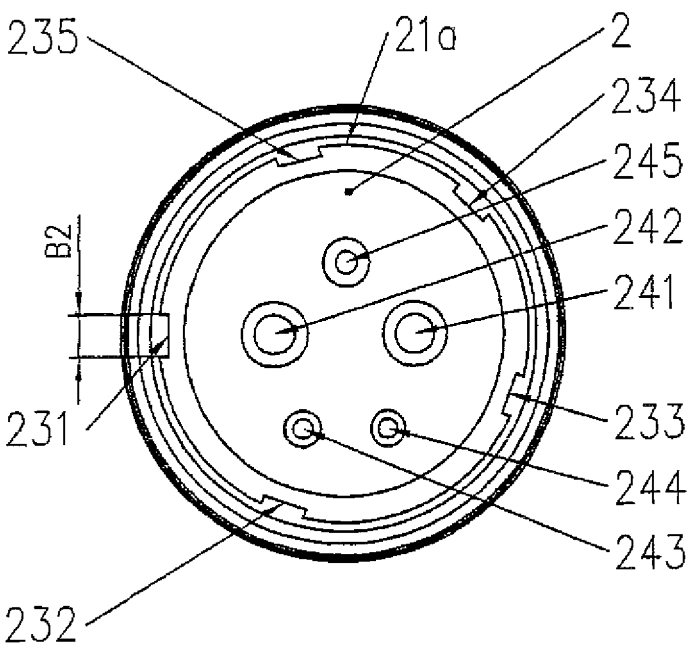
FIG. 3*b* shows a plan view of the plasma cutting torch head from the bearing side.

As can be seen from FIGS. 3*a* and 3*b*, the plasma cutting torch shaft 3 has five similar rectangular lugs 331, 332, 333, 334 and 335 peripherally on its inner surface 31*a*, and the plasma cutting torch head 2 has five similar correspondingly designed and arranged rectangular grooves 231, 232, 233, 234 and 235 on its outer surface 21*a*. The lugs 331 to 335 and grooves 231 to 235 are arranged in the axial direction such that when the plasma cutting torch shaft 3 is joined to the plasma cutting torch head 2, the grooves and lugs are first engaged before the first bearing surface and the second bearing surface come into abutment.

Figure 4A:
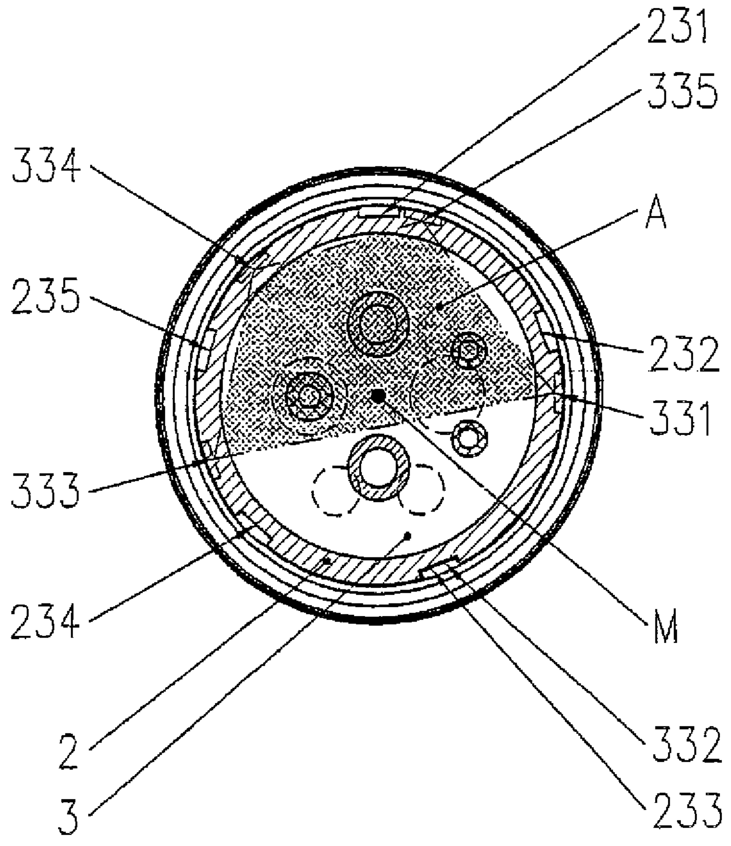
FIG. 4*a* shows a sectional view of the plasma cutting torch head and shaft in the joining position in the region of the indentations and projections.

When the plasma cutting torch head 2 is inserted into the plasma cutting torch shaft 3, the annular surface 22 of the plasma cutting torch head 2 usually encounters the lugs 331 to 335 (see FIG. 4*a*). The plasma cutting torch head 2 and the plasma cutting torch shaft 3 are thus located in the joining position.

Figure 4B:
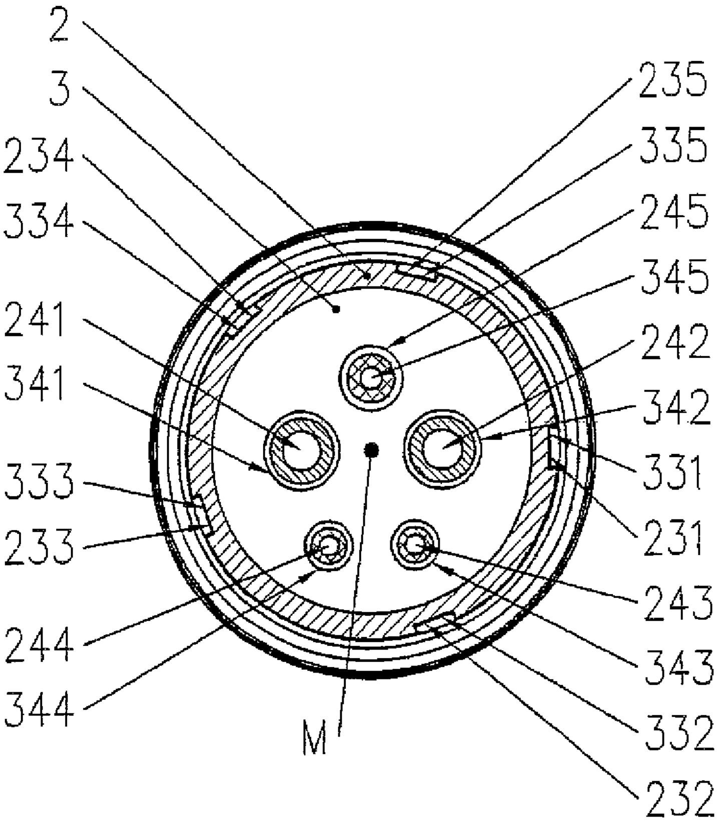
FIG. 4*b* shows a sectional view of the plasma cutting torch head and shaft in the joint position in the region of the indentations and projections.

Since the sum of two adjacent angles at the center of the angles at the center α, β, γ, δ and ϵ (see FIG. 8) at which the grooves 231 to 235 are arranged is not ≥180°, and the five angles at the center are different in size, the lugs 331 to 335 together with the annular surface 22 of the plasma cutting torch head interrupted by the grooves 231 to 235 form a virtual closed surface A relative to one another in any position except the joint position (see FIG. 4*b*). With the exception of the joint position, the grooves 231 to 235 are always arranged such that the lugs resting on the annular surface 22 of the plasma cutting torch head 2 (in FIG. 4*a* the lugs 331, 333, 334 and 335) form a quadrangle with the area A, in which the center axis M of the plasma cutting torch 1 is located (see FIG. 4*a*).

Figure 9:
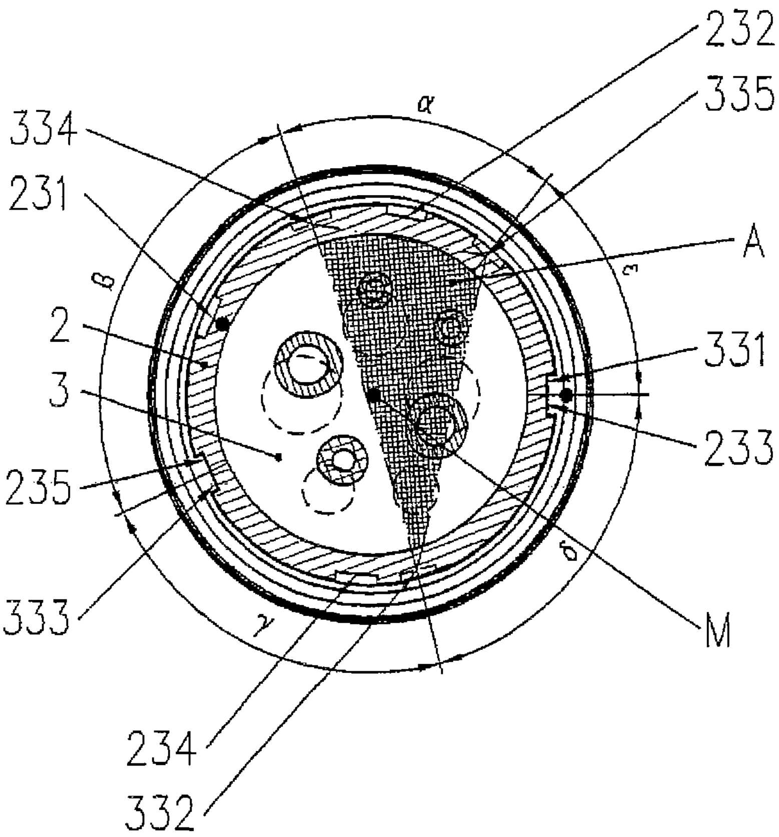
FIG. 9 shows a view similar to FIG. 4*a*.

If the additional condition is not met that the sum of two adjacent angles at the center of the angles at the center α, β, γ, δ and ϵ is repeated, only a triangular area A can be formed, as is shown in FIG. 9.

Because of the fact that the center axis M of the plasma cutting torch 1 is located in the area A, the plasma cutting torch shaft 3 and the plasma cutting torch head 2 can be twisted in any direction relative to one another until the joint position is reached. Once the joint position is reached, the plasma cutting torch head 2 slides into the plasma cutting torch shaft 3 under the effect of an axial force, and the two can be inserted into one another (see FIGS. 2, 4*b* and 5).

Figure 5:
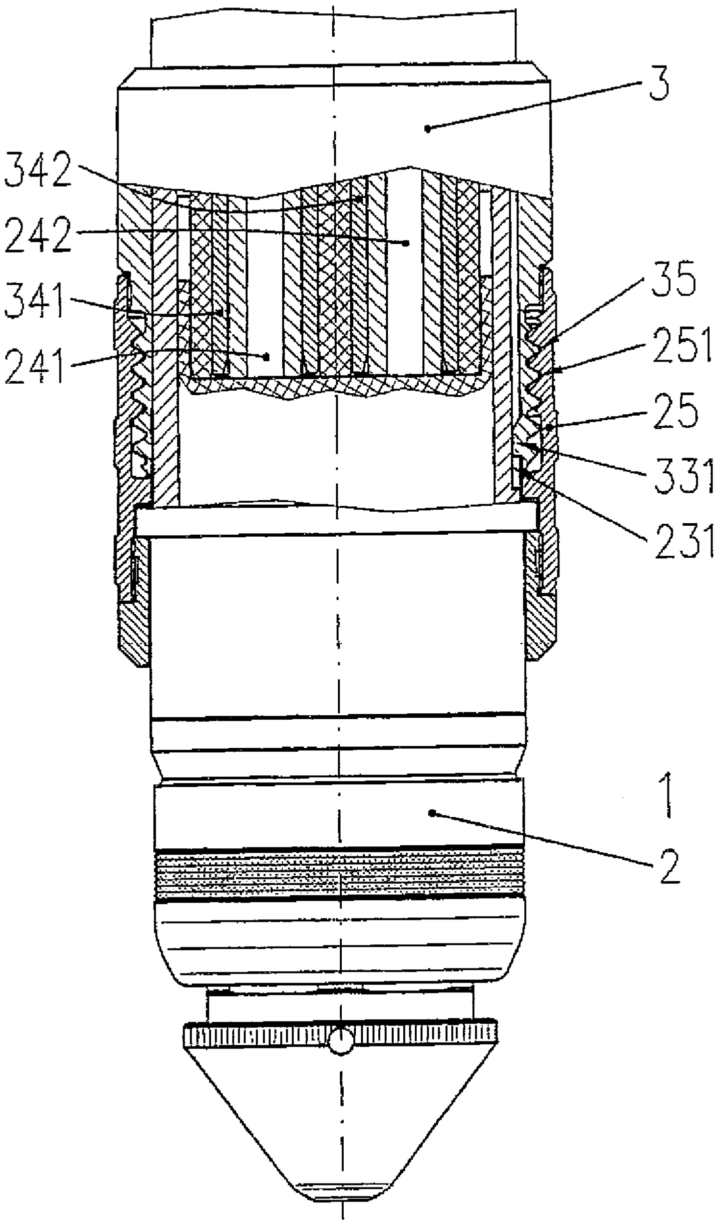
FIG. 5 shows a side view of the front part of the plasma cutting torch after the plasma cutting torch head and plasma cutting torch shaft have been joined together, partially in section.

By turning a clamping sleeve 25, a further axial force is exerted on the interface via the internal threads 251 of the clamping sleeve and the external threads 35 of the plasma cutting torch shaft 3, until the final joint position is reached (see FIG. 5). There, the diameter of the plasma cutting torch shaft is reduced from D31*a* to D31*b*, as a result of which the play S is reduced or even eliminated completely and the centricity is increased. This can of course also be achieved by other mechanisms, such as a bayonet fitting or some other tightening means.

The grooves 231 to 235 are usually larger than the lugs 331 to 335, since it would not otherwise be possible to join them together. The dimension B stands for the central width of the grooves and lugs and is calculated (see FIGS. 3*a* and 3*b*) as follows:

$$B = \frac{B2 + B3}{2}.$$

The similar design of the grooves and lugs means that production effort is reduced compared to an embodiment with different lugs and thus grooves, in which three grooves and lugs would be sufficient. It is then possible to work with a single tool.

Figure 6:
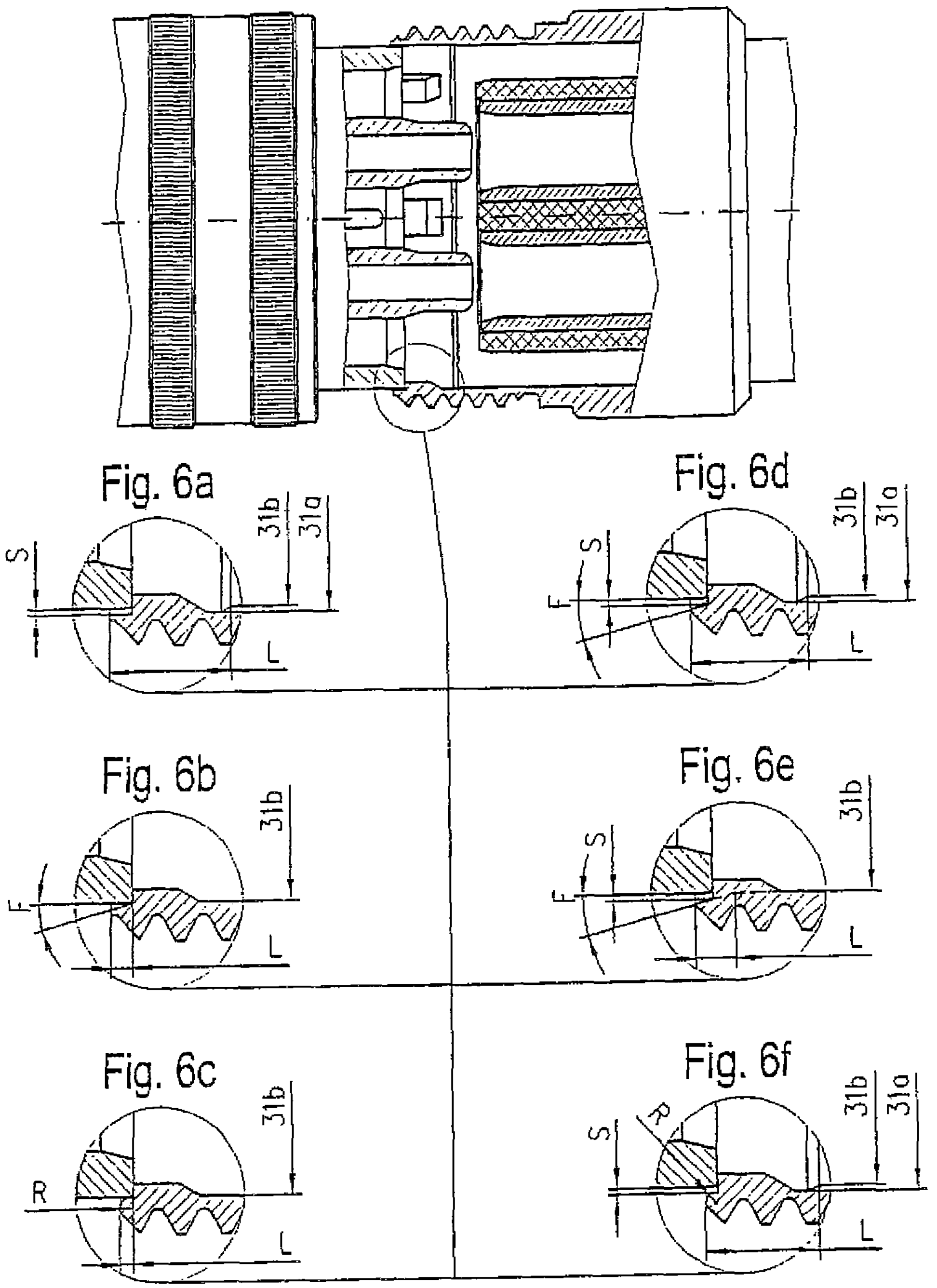
FIG. 6 shows a section of FIG. 2.

To simplify the joining process, the inner surface 31*a* can be designed differently. It can have greater play S with a cylindrical shape (FIG. 6*a*), an angle F (FIG. 6*b*) a radius (FIG. 6*c*) or a combination of the individual elements (FIGS. 6*d*, 6*e* and 6*f*). It is sufficient for the grooves and lugs to be substantially similar in shape and size. It is only necessary for the grooves and lugs to be designed such that a polygon condition, for example a triangle or quadrangle, are met.

Consider the following dimensional example:

The central diameter D of the first cylinder wall and the second cylinder wall is calculated as follows (see FIG. 1):

$$D = \frac{D31b + D21a}{2}.$$

$D$: 25 to 100 mm $F$: 15 to 60°

$$S = \frac{D31a - D21a}{2}$$

$S$: 0.2 to 0.7 mm $R$: 1 to 5 mm.

Figure 8:
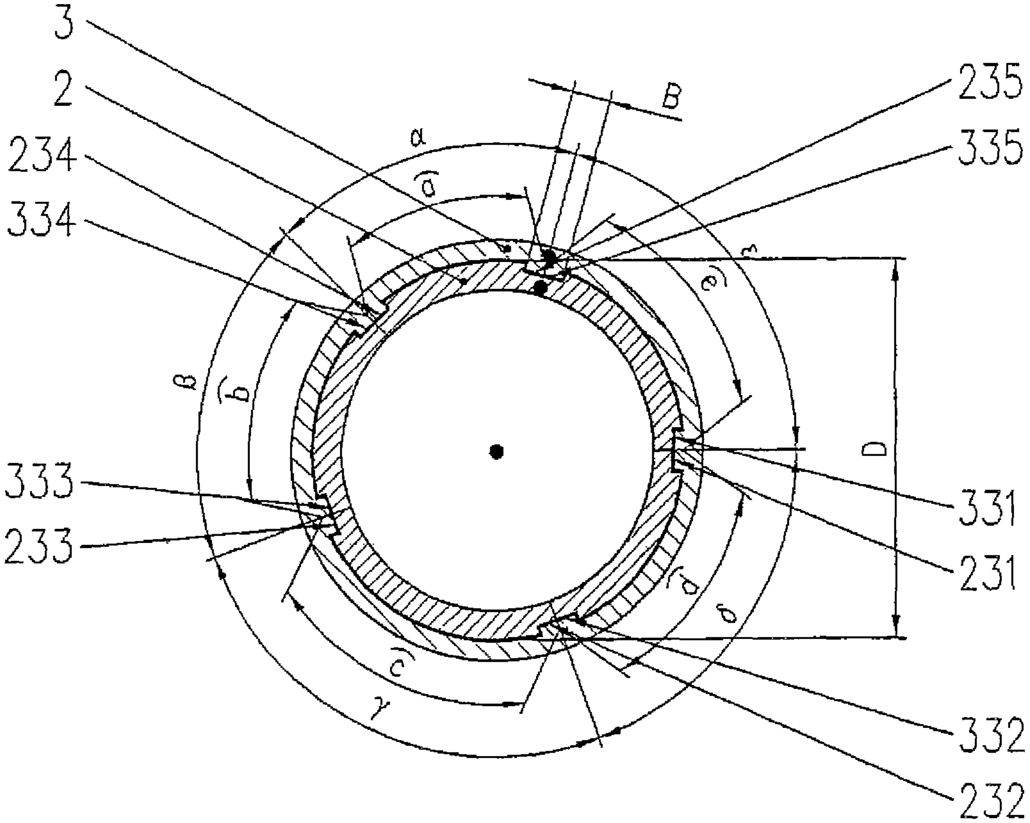
FIG. 8 shows details from FIG. 4*b*.

In FIG. 8 the parameters are as follows:

α=75°

β=70°

γ=90°

δ=65°

ϵ=60°.

The spaces a, b, c, d and e between the lugs/grooves are shown in FIG. 8. These are the spaces between the axes of symmetry of the lugs and grooves 231 to 235 on the central diameter D. They are calculated according to the formula:

$$a = \frac{\Pi \times D \times \alpha}{360°} \text{ in mm}$$

$$b = \frac{\Pi \times D \times \beta}{360°} \text{ in mm}$$

etc.

In FIG. 9, the angles are selected as follows:

α=60°

β=95°

γ=80°

δ=75°

ϵ=50°.

$$\alpha+\beta=\gamma+\delta$$

$$\alpha°+95°=80°+75°=155°.$$

Consequently, the sum of two adjacent angles at the center, namely of α and β and of γ and δ is repeated.

Figure 7:
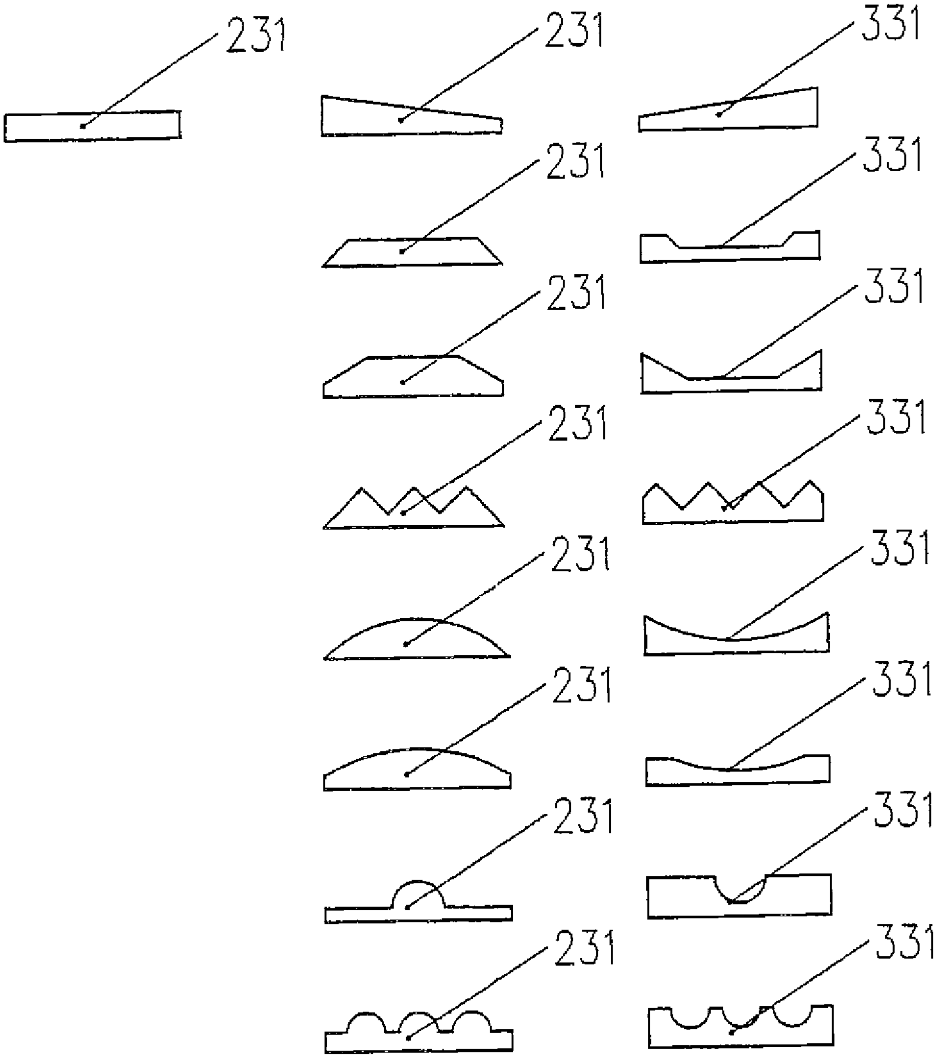
FIG. 7 shows various embodiments of indentations and/or projections.

FIG. 7 depicts multiple examples of possible designs of pairs of lugs 331 and grooves 231. In considering this illustrative example, it will be appreciated that the lugs could, however, also be used as grooves and the grooves as lugs within the anticipated scope of the invention.

The features of the invention disclosed in the present description, in the drawings and in the claims can be essential to implementing the invention in its various embodiments both individually and in any combinations. It will be appreciated that various other combinations and variations are also possible within the intended scope of the invention.

The invention claimed is:

1. A plasma torch head comprising:

at least one fluid passage, an electrode, a nozzle, a current conductor and a bearing surface on a bearing side, said torch head having on said bearing side a first cylinder wall with an outer surface and an annular surface, said first cylinder wall having an external diameter of D21*a*, said outer surface having $n_{Ver}$ similar radial indentations and $n_{Vor}$ similar radial projections provided peripherally thereon where $n_{Ver}$, $n_{Vor}$ are ≥0 and $n_{Ver}+n_{Vor}=n\geq5$, a quantity n combined radial indentations and radial projections, and at least five angles at the center α, β, γ, δ, and ϵ;

where n=5, the sum of two adjacent angles at the center among α and β,β and γ, γ and δ, δ and ϵ, and ϵ and α, by which at least one of said projection and indentations are offset from any other projection or indentation, is not ≥180°, and said angles at the center α, β, γ, δ, and ϵ are different in size;

where n>5:

where the n>5 angles at the center α, β, γ, δ, and ϵ are different in size, the sum of two adjacent angles at the center among α and β, β and γ, γ and δ, δ and ϵ, and ϵ and α, by which at least one of said projection and indentations is offset from any other projection or indentation is >0° and <180°; and where at least two of the n>5 angles at the center among α, β, γ, δ, and ϵ are equal in size, the sum of the respective angles at the center among α, β, γ, δ and ϵ occurring twice and the adjacent angles at the center on either side thereof among α and γ, β and δ, γ and ϵ, ϵ and α, and ϵ and β is >0° and <180°; and when said plasma torch head is attached to a plasma cutting torch shaft, said plasma cutting torch shaft having a second cylinder wall having an internal diameter of D31*a*, the play S between said external diameter D21*a* of said first cylinder wall and said internal diameter D31*a* D31*a*>D21*a* of said second cylinder wall is defined as:

$$S=(D31a--D21a)/2$$

2. The plasma torch head of claim 1, the sum of two adjacent angles at the center among α and β, β and γ, γ and δ, δ and ϵ, and ϵ and α is >0° and ≤170°.

3. The plasma torch head of claim 1, n=5 and the sum of two adjacent angles at the center among α and β, β and γ, γ and δ, δ and ϵ, and ϵ and α is not repeated.

4. The plasma torch head of claim 1, further comprising four fluid passageways.

5. The plasma torch head of claim 1, at least one fluid passage having a connector.

6. The plasma torch head of claim 1, the current conductor having a connector.

7. The plasma torch head of claim 1, said indentations being rectangular grooves.

8. The plasma torch head of claim 1, $n_{Ver}$ being ≥5.

9. The plasma torch head of claim 1, $n_{Vor}$ being ≥5.

10. A plasma torch shaft, comprising:

at least one feed line for a gas, a current supply line, at least one fluid passage, a current conductor and a bearing surface on a bearing side, said torch having on its bearing side a second cylinder wall with an inner surface and an internal diameter D31*a*, where $n_{Vor}$ similar radial projections and $n_{Ver}$ similar radial indentations are provided peripherally on said inner surface, where $n_{Vor}$, $n_{Ver}$ are ≥0 and $n_{Vor}+n_{Ver}=n\geq5$, a quantity n combined radial indentations and radial projections, and at least five angles at the center α, β, γ, δ, and ϵ;

where n=5, the sum of two adjacent angles at the center among α and β, β and γ, γ and δ, δ and ϵ, and ϵ and α by which at least one of said projection and indentations are offset from any other projection or indentation, is not ≥180°, and said five angles at the center α, β, γ, δ, and ϵ are different in size;

where n>5;

where the n>5 angles at the center α, β, γ, δ, and ϵ are different in size, the sum of two adjacent angles at the center among α and β, β and γ, γ and δ, δ and ϵ, and ϵ and α, by which at least one of said projection and indentations is offset from any other projection or indentation is >0° and <180°; and where at least two of the n>5 angles at the center among α, β, γ, δ, and ϵ are equal in size, the sum of the respective angles at the center among α, β, γ, δ and ϵ occurring twice and the adjacent angles at the center on either side thereof among α and γ, β and δ, γ and ϵ, δ and α, and ϵ and β is >0° and <180°; and when said plasma torch shaft is attached to a plasma torch head, said plasma torch head having a first cylinder wall having an external diameter of D21*a*, the play S between said external diameter D21*a* of said first cylinder wall and said internal diameter D31*a* D31*a*>D21*a* of said second cylinder wall is defined as:

$$S=(D31a-D21a)/2$$

11. The plasma torch shaft of claim 10, the sum of two adjacent angles at the center among α and β, β and γ, γ and δ, δ and ϵ, ϵ and α is >0° and ≤170°.

12. The plasma torch shaft of claim 10, n=5 and the sum of two adjacent angles at the center among α and γ, β and δ, γ and ϵ, and ϵ and β is not repeated.

13. The plasma torch shaft of claim 10, a feed line for secondary gas is provided, said feed line including four fluid passageways.

14. The plasma torch shaft of claim 10, said at least one fluid passage being a socket.

15. The plasma torch shaft of claim 10, the current conductor having a socket.

16. The plasma torch shaft of claim 10, projections being rectangular lugs.

17. The plasma torch shaft of claim 10, a peripheral chamfer extending radially outwards being provided on the inner surface of the second cylinder wall towards the bearing side before the projections and indentations.

18. The plasma torch shaft of claim 10, $n_{Vor}$ being ≥5.

19. The plasma torch shaft of claim 10, $n_{Ver}$ being ≥5.

20. A plasma torch comprising:

at least one feed line for a gas, an electrode, a nozzle and a current supply line, said plasma torch including a plasma torch shaft having at least one first fluid passage, a first current conductor and a first bearing surface on a bearing side, a plasma torch head including at least one second fluid passage, a second current conductor and a second bearing surface on a bearing side, said first and second bearing surfaces resting axially relative to one another, and said at least one first fluid passage being in fluid connection with said at least one second fluid passage, and said first current conductor being in electric connection with said second current conductor;

one of said plasma torch shaft and said plasma torch head having, on its bearing side, a first cylinder wall with an outer surface and an annular surface and an external diameter D21_a_, and said other of the plasma torch shaft and said plasma torch head having on its bearing side, a second cylinder wall with an inner surface and an internal diameter D31_a_, where D31_a_ is >D21_a_, and $n_{Vor}$ similar radial projections and $n_{Ver}$ similar radial indentations being provided peripherally on said inner surface, a quantity n combined radial indentations and radial projections, where $n_{Vor}$, $n_{Ver}$ is ≥0 and $n_{Vor}$+ $n_{Ver}$=n≥5, and $n_{Ver}$ corresponding indentations and $n_{Ver}$ corresponding projections in engagement being provided on said outer surface; said projections and indentations being further arranged such that when said plasma torch shaft is connected to said plasma torch head, said projections and indentations must be first brought into engagement before said first bearing surface and said second bearing surface come to abut each other;

where n=5, the sum of two adjacent angles at the center among α and β, β and γ, γ and δ, δ and ϵ, and ϵ and α, by which at least one of said projection and indentations is offset from any other projection or indentation, is >0° and <180°, and said five angles at the center α, β, γ, δ, and ϵ are different in size;

where n>5:

where the n>5 angles at the center α, β, γ, δ, and ϵ are different in size, the sum of two adjacent angles at the center among α and β, β and γ, γ and δ, δ and ϵ, and ϵ and α, by which at least one of said projection and indentations is offset from any other projection or indentation is >0° and <180°; and where at least two of the n>5 angles at the center among α, β, γ, δ, and ϵ are equal in size, the sum of the respective angles at the center α, β, γ, δ and ϵ occurring twice and the adjacent angles at the center on either side thereof among α and γ, β and δ, γ and ϵ, δ and α, and ϵ and β is >0° and <180°; and when said plasma torch shaft is attached to said plasma torch head, the play S between said external diameter D21_a_ and said internal diameter D31_a_ D31_a_>D21_a_ is defined as:

$$S=(D31a-D21a)/2$$

21. The plasma torch shaft of claim 20, the sum of two adjacent angles at the center among α and β, β and γ, γ and δ, δ and ϵ, and ϵ and α is >0° and ≤170°.

22. The plasma torch of claim 20, n=5 and the sum of two adjacent angles at the center among α and β, β and γ, γ and δ, δ and ϵ, and ϵ and α is not repeated.

23. The plasma torch of claim 20, a feed line for secondary gas being provided, said plasma torch shaft including four first fluid passageways and said plasma torch head including four second fluid passageways.

24. The plasma torch of claim 20, the coolant being water.

25. The plasma torch of claim 20, at least one first fluid passage having a socket.

26. The plasma torch of claim 20, said at least one second fluid passage having a connector.

27. The plasma torch of claim 20, said first current conductor having a socket.

28. The plasma torch of claim 20, said second current conductor having a socket.

29. The plasma torch of claim 20, said plasma torch head having said first cylinder wall and said plasma torch shaft having said second cylinder wall.

30. The plasma torch of claim 20, said indentations being rectangular grooves.

31. The plasma torch of claim 20, a peripheral chamfer extending radially outwards being provided on said inner surface of said second cylinder wall towards said bearing side before said projections and said indentations.

32. The plasma torch of claim 20, $n_{Vor}$ being ≥5.

33. The plasma torch of claim 20, $n_{Ver}$ being ≥5.

34. The plasma torch of claim 20, a holding means for holding said plasma torch head and said plasma torch shaft together is provided.

35. The plasma torch of claim 34, said holding means being a clamping sleeve.

* * * * *